US 9,473,615 B2

(12) United States Patent
Greene et al.

(10) Patent No.: US 9,473,615 B2
(45) Date of Patent: Oct. 18, 2016

(54) COMPUTER READABLE METHOD FOR SPEED DIALLING NUMBERS INCLUDING REPETITIVE-DIGITS AND 800

(71) Applicants: Fred Greene, Fort Lauderdale, FL (US); Cameron Grace, Fort Lauderdale, FL (US)

(72) Inventors: Fred Greene, Fort Lauderdale, FL (US); Cameron Grace, Fort Lauderdale, FL (US)

( * ) Notice: Subject to any disclaimer, the term of this patent is extended or adjusted under 35 U.S.C. 154(b) by 0 days.

(21) Appl. No.: 14/958,652

(22) Filed: Dec. 3, 2015

(65) Prior Publication Data

US 2016/0088137 A1   Mar. 24, 2016

(51) Int. Cl.
*H04W 4/16* (2009.01)
*H04M 1/725* (2006.01)
*H04M 1/2745* (2006.01)

(52) U.S. Cl.
CPC ... *H04M 1/72525* (2013.01); *H04M 1/274558* (2013.01); *H04M 2001/274541* (2013.01)

(58) Field of Classification Search
CPC .......... H04L 45/563; H04L 29/06387; H04L 67/34; G06F 8/60; G06F 9/445; H04M 3/42; H04M 3/52; H04M 1/2473; H04M 1/72525; H04M 3/44; H04M 1/27; H04M 3/424; H04M 2242/18; H04M 2242/16; H04M 1/274575; H04M 1/72527; H04M 9/003; H04M 3/62; H04M 1/677; H04M 3/5235; H04M 3/42178; H04Q 2213/13331; H04Q 2213/331; H04W 4/00; H04W 4/003; H04W 4/16; H04W 88/02; H04W 92/08; H04W 92/00; H04W 76/02; H04W 3/42
See application file for complete search history.

(56) References Cited

U.S. PATENT DOCUMENTS

| | | | | | |
|---|---|---|---|---|---|
| 6,052,070 | A * | 4/2000 | Kivela | .................. | G06F 3/0236 341/22 |
| 6,108,406 | A * | 8/2000 | Mitchell | ............. | H04M 1/2471 379/93.25 |
| 6,246,757 | B1 * | 6/2001 | Cai | ........................ | H04M 15/90 379/114.15 |
| 6,980,642 | B1 * | 12/2005 | Hung | .............. | H04M 1/274558 379/355.05 |
| 2004/0040964 | A1 * | 3/2004 | Ullmann | .............. | B65D 17/161 220/269 |
| 2005/0197163 | A1 * | 9/2005 | Lee | .................. | H04M 1/27455 455/564 |
| 2008/0200212 | A1 * | 8/2008 | Morrill | ............. | H04M 1/72502 455/566 |
| 2008/0295017 | A1 * | 11/2008 | Tseng | ................ | H04M 1/72583 715/777 |
| 2009/0175432 | A1 * | 7/2009 | Whitehead | ...... | H04M 1/274583 379/216.01 |
| 2009/0191853 | A1 * | 7/2009 | Van Praagh | .......... | H04L 67/306 455/414.3 |
| 2011/0202594 | A1 * | 8/2011 | Ricci | .................. | H04M 3/4931 709/203 |
| 2014/0258970 | A1 * | 9/2014 | Brown | ..................... | G06F 8/47 717/103 |

* cited by examiner

*Primary Examiner* — Meless Zewdu
(74) *Attorney, Agent, or Firm* — Barry Choobin; Patent 360

(57) ABSTRACT

The various embodiments herein provide a computer readable method for speed dialling a user preferred number comprises downloading and installing the computer readable method in a mobile device and updating a keypad with a set of speed dialling keystrokes. The user selects a number format in a Graphical User Interface (GUI) provided by the computer readable method for speed dialling resulting into an appearance of a keyboard and a text field on the GUI. The intended keyword is entered by the user in the appeared text field through the keyboard. The GUI displays suggestions of the probable numbers on the basis of the entered keyword. The user selects an intended number from the displayed probable numbers. The number is automatically dialled on the selection of the intended number.

5 Claims, 1 Drawing Sheet

COMPUTER READABLE METHOD FOR SPEED DIALLING NUMBERS INCLUDING REPETITIVE-DIGITS AND 800

BACKGROUND

1. Technical Field

The embodiments herein generally relate to a mobile-based computer readable method and particularly relates to a computer readable method for speed dialing numbers with repetitive numerals. The embodiments herein more particularly relate to a computer readable method for speed dialing numbers with repetitive digits such numbers with "star-star combination" and numbers comprising or initiating with 800 or 8XX.

2. Description of the Related Art

Speed dial is a function available on many telephone systems allowing the user to place a call by pressing a reduced number of keys. This function is particularly useful for phone users who dial certain numbers on a regular basis.

In most cases, the user stores these numbers in the phone's memory for future use. The speed dial numbers are usually accessed by pressing a pre-determined key or keys on the phone, followed by a one or two-digit code which the user assigns to each number; however for ease of use, on many systems a call may be placed by pressing and holding one key on the numeric keypad.

Speed dialing is also available via Custom Calling features from the Telephone Company's Central Office. The numbers are programmed by the subscriber through the standard telephone dial, and speed dial calls are placed by dialling simply the digit and waiting a few seconds on a standard rotary dial phone and an older 10 key Touch Tone phone, or by dialing the number and the # key to instantly connect the call on a modern 12 key Touch Tone phone.

One of the prior arts discloses a telecommunication apparatus includes means for establishing a connection using alphanumeric dialing, and means for recognizing a predefined sub-string in a predefined position in a dialed alphanumeric string, so as to set up a free-of-charge connection when the predefined sub-string is recognized. The use may be notified in the event of a free-of-charge connection.

Another prior art discloses a method and apparatus for selecting among calling options in a wireless communications device is provided. A determination is made as to whether a calling option mode is to be selected, and if the calling option mode is selected, a plurality of calling options are displayed. The user selects a calling option from the plurality of displayed calling options, and a call is originated as a function of the selected calling option. The calling options include originating a call billable to a calling card account, originating a call using a paging service, and originating a call using a text messaging facility. A displayed set-up option corresponding to a calling option set-up facility is also provided.

Yet another prior art discloses a portable electronic device that allows a user to dial a telephone number using a virtual rotary dial pad configuration. The device includes a physically depressible touch screen display. Speed dialing is enabled by touching and dragging a selected numeric or non-numeric symbol to a predetermined location on the touch screen display and by holding the selected symbol at the predetermined location for a predetermined duration of time. Successful dialing of a symbol results in tactile, audio or visual feedback. Touching and dragging selected symbols may be replaced by touching the selected symbol and physically depressing the touch screen. Both numeric and non-numeric symbols may be dialed.

Although, a speed dialing is conventionally implemented method through a computer readable program or a hardware encoding. But the prior arts are limited in manual saving the speed dialing list in a prioritized format. The prior arts fails to provide a system or a method to dial, the commonly used numbers and numbers with generic or repetitive sequence. Thus, a user has to re-enter such numbers on every intended instance.

In view of the foregoing, there is a need for a computer readable method for detecting a user intention to dial a number with repetitive digits, numbers with "star-star combination" and numbers comprising or initiating with 800 or 8XX. Also there is a need for a computer readable program with dynamically suggesting a number to the user on the basis of a user preference and automatically speed dialing the same.

The abovementioned shortcomings, disadvantages and problems are addressed herein, as detailed below.

SUMMARY OF THE INVENTION

The primary object of the embodiments herein is to provide a computer readable method for detecting a user intention to dial a number with repetitive digits, numbers with "star-star combination" and numbers comprising or initiating with 800 or 8XX.

Another object of the embodiments herein is to provide a computer readable program with dynamically suggesting a number to the user on the basis of a user preference and automatically speed dialing the same.

Yet another object of the embodiments herein is to provide a plurality of shortcuts on a keypad of a mobile device to enter the number with repetitive digits, numbers with "star-star combination" and numbers comprising or initiating with 800 or 8XX.

The various embodiments herein provide a computer readable method for speed dialing a user preferred number comprises downloading and installing the computer readable method in a mobile device and updating a keypad with a set of speed dialing keystrokes. The user selects a number format in a Graphical User Interface (GUI) provided by the computer readable method for speed dialing resulting into an appearance of a keyboard and a text field on the GUI. The intended keyword is entered by the user in the appeared text field through the keyboard. The GUI displays suggestions of the probable numbers on the basis of the entered keyword. The user selects an intended number from the displayed probable numbers. The number is automatically dialed on the selection of the intended number.

According to an embodiment herein, the number format comprises a number with a star-star combination, a number with repetitive digits, a number with 800 and a number with 8XX.

According to an embodiment herein, the computer readable method comprises a set of prestored numbers in a database, wherein the set of prestored numbers in the database comprises a number with a star-star combination, a number with repetitive digits, a number with 800 and a number with 8XX.

According to an embodiment herein, the probable numbers appear on partial input of the intended keyword by the user. The GUI also displays probable keywords at an earliest time frame during entering the partial keyword.

According to an embodiment herein, the probable numbers appear on complete input of the intended keyword by the user.

According to an embodiment herein, an appearance and keystroke format over the GUI is modifiable as per user preference.

According to an embodiment herein, a search and display time frame for searching the probable numbers in the database on the basis of the entered keyword is less than 1500 ms.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

Figure 1:
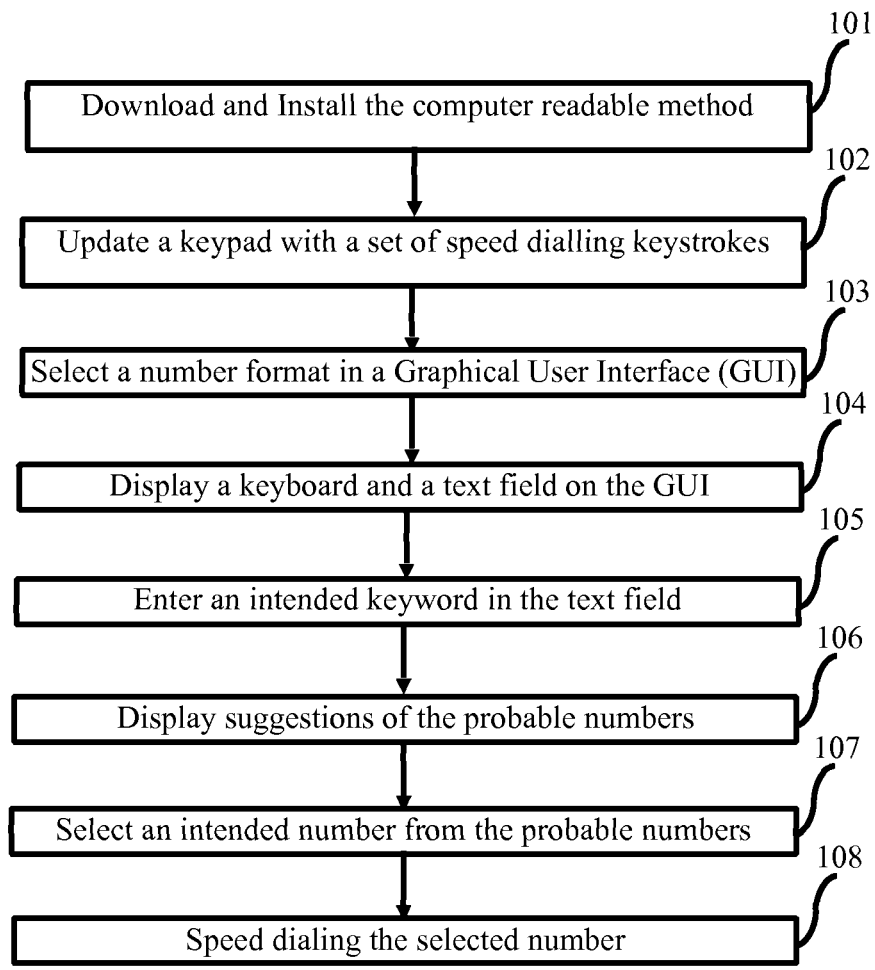
FIG. 1 illustrates a flowchart of the computer readable method for speed dialing a predefined set of numbers, according to an embodiment herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

FIG. 1 illustrates a flowchart of the computer readable method for speed dialing a predefined set of numbers, according to an embodiment herein. With respect to FIG. 1, the computer readable method for speed dialing a user preferred number comprises downloading and installing the computer readable method in a mobile device (101) and updating a keypad with a set of speed dialing keystrokes (102). The user selects a number format in a Graphical User Interface (GUI) provided by the computer readable method for speed dialing (103) resulting into an appearance of a keyboard and a text field on the GUI (104). The intended keyword is entered by the user in the appeared text field through the keyboard (105). The GUI displays suggestions of the probable numbers on the basis of the entered keyword (106). The user selects an intended number from the displayed probable numbers (107). The number is automatically dialed on the selection of the intended number (108).

According to an embodiment herein, the number format comprises a number with a star-star combination, a number with repetitive digits, a number with 800 and a number with 8XX.

According to an embodiment herein, the computer readable method comprises a set of prestored numbers in a database, wherein the set of prestored numbers in the database comprises a number with a star-star combination, a number with repetitive digits, a number with 800 and a number with 8XX.

According to an embodiment herein, the probable numbers appear on partial input of the intended keyword by the user. The GUI also displays probable keywords at an earliest time frame during entering the partial keyword.

According to an embodiment herein, the probable numbers appear on complete input of the intended keyword by the user.

According to an embodiment herein, an appearance and keystroke format over the GUI is modifiable as per user preference.

According to an embodiment herein, a search and display time frame for searching the probable numbers in the database on the basis of the entered keyword is less than 1500 ms.

According to an embodiment herein, a user case for speed dialing a number with star-star combination is displayed by Table no. 1:

TABLE NO. 1

| | User Case scenario for dialing a star-star number |
|---|---|
| Name | UC-1: Dial a star-star number |
| Summary | User dials a star-star number by typing a keyword into text field |
| Rationale | Many users find dialing a star-star number confusing and time consuming to mentally analyze and determine the correct desired number-letter combination to type into a number pad. The star-star number dialing function eliminates this burden by allowing the user to focus on simply typing a keyword into a text field and hitting the dial/place call button. The task of calculating the correct number-letter combination is placed on the application. |
| Users | All users |
| Preconditions | A phone dialing user interface is open |
| Basic Course of Events | 1. The user indicates that the application is to dial a star-star number by hitting the appropriate button<br>2. The application responds by displaying a keyboard and a text field<br>3. The user inputs a keyword and hits the dial/place call button<br>4. The application responds by dialing the keyword-associated star-star number |
| Alternative Paths | 1. In step 3, the user types in an invalid keyword. In this case, a message is displayed on screen describing the error to the user. The post-condition is displaying the error message. |
| Post-conditions | The desired star-star number has been dialed |

According to an embodiment herein, a user case for speed dialing a number with 800 is displayed by Table no. 2:

TABLE NO. 2

User Case scenario for dialing a 800 number

| | |
|---|---|
| Name | UC-2: Dial an 800-number |
| Summary | User dials an 800-number by typing a keyword into text field |
| Rationale | Many users find dialing an 800-number confusing and time consuming to mentally analyze and determine the correct desired number-letter combination to type into a number pad. The 800-number dialing function eliminates this burden by allowing the user to focus on simply typing a keyword into a text field and hitting the dial/place call button. The task of calculating the correct number-letter combination is placed on the application. |
| Users | All users |
| Preconditions | A phone dialing interface is open |
| Basic Course of Events | 1. The user indicates that the application is to dial an 800-number by hitting the appropriate button<br>2. The application responds by displaying a keyboard and a text field<br>3. The user inputs a keyword and hits the dial/place call button<br>4. The application responds by dialing the keyword-associated 800-number |
| Alternative Paths | 1. In step 3, the user types in an invalid keyword. In this case, a message is displayed on screen describing the error to the user. The post-condition is displaying the error message. |
| Post-conditions | The desired 800-number has been dialed |

According to an embodiment herein, the functional requirements for speed dialing a predefined set of numbers is provided by Table 3:

| | |
|---|---|
| Name | FR-1: Selecting the dial a star-star number function or an 800-number function |
| Summary | The user decides which of the two functions they want to use. Either the dial a star-star number function or the dial an 800-number function is invoked when the user selects the associated button. |
| Rationale | Users know the number type that they wish to dial. By keeping the functions separate, two separate, corresponding databases can be implemented containing the appropriate data for each function. This increases back-end maintainability and performance efficiency. |
| Requirements | When a user invokes either the dial a star-star number function or the dial an 800-number function, the application displays a keyboard and text field. When the user enters a keyword and selects the dial/place call button, the input is logically evaluated by the applications' algorithm to see if there is a key-value match to a record on the associated database. The resulting outcomes are as follows:<br>If there is a valid match, the phone will dial the associated phone number<br>If there is not a valid match, an error message will display on screen to the user |
| References | UC-1: Dial a star-star number<br>UC-2: Dial an 800-number |

According to an embodiment herein, the non-functional requirements for speed dialing a predefined set of numbers is provided by Table 4:

| | |
|---|---|
| Name | NF-1: Performance constraints for dial a star-star number and dial an 800-number functions |
| Summary | The dial a star-star number and dial an 800-number functions must perform quickly |
| Rationale | If either of these functions does not perform fast enough, users will avoid using the application |
| Requirements | Logically querying the database for a keyword match term must take under 1500 ms for the following platforms:<br>On a Dual-core 1 GHz or higher at 50% CPU load or less<br>On a Dual-core 1.2 GHz or higher at 50% CPU load or less<br>On a Dual Core 1.2 GHz or higher at 50% CPU load or less |
| References | UC-1: Dial a star-star number<br>UC-2: Dial an 800-number |

The present invention provides a speed dialing for a plurality of commonly used numbers that reduces a user's effort to memorize or store the numbers. Also, the display time of the probable numbers on the basis of entered keyword is less resulting into hassles speed dialing experience for the users.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:

1. A non-transitory computer readable medium comprising instructions run on a mobile device for speed dialling a user preferred number comprising the steps of:
   - downloading and installing the computer readable method in a mobile device;
   - updating a keypad with a set of speed dialing keystrokes, and wherein a plurality of shortcuts is provided on a keypad of a mobile device to enter the number with repetitive digits, numbers with "star-star combination" and numbers comprising or initiating with 800 or 8XX, and wherein the keypad comprises a star-star number dialing function and a 800-number dialing function;
   - selecting a number format by a user in a Graphical User Interface (GUI) provided by the computer readable method for speed dialing;
   - appearing a keyboard and a text field on the GUI, and wherein an appearance and keystroke format over the GUI is modifiable as per user preference;
   - entering an intended keyword by the user in the text field through the keyboard;
   - displaying suggestions of probable numbers over the GUI on the basis of the entered keyword;
   - selecting an intended number from the probable numbers, wherein the number is automatically dialed on the selection of the intended number wherein the number format comprises a number with the star-star combination, a number with the repetitive digits, a number with the 800 and a number with the 8XX.

2. The computer readable method according to claim 1 comprises a set of prestored numbers in a database, wherein the set of prestored numbers in the database comprises the number with the star-star combination, the number with the repetitive digits, the number with 800 and the number with 8XX.

3. The computer readable method according to claim 1, wherein the probable numbers appear on partial input of the intended keyword by the user, wherein the GUI also displays probable keywords at an earliest time frame during entering the partial keyword.

4. The computer readable method according to claim 1, wherein the probable numbers appear on complete input of the intended keyword by the user.

5. The computer readable method according to claim 1, wherein a search and display time frame for searching the probable numbers in the database on the basis of the entered keyword is less than 1500 ms.

* * * * *